US007898691B2

(12) United States Patent
Saito et al.

(10) Patent No.: US 7,898,691 B2
(45) Date of Patent: Mar. 1, 2011

(54) IMAGE PROCESSOR, IMAGE FORMATION DEVICE, IMAGE PROCESSING METHOD, AND COMPUTER-READABLE MEDIUM

(75) Inventors: Takeshi Saito, Kanagawa (JP); Kazuo Asano, Kanagawa (JP); Toru Misaizu, Kanagawa (JP); Shigeru Arai, Kanagawa (JP); Kouta Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 472 days.

(21) Appl. No.: 12/058,860

(22) Filed: Mar. 31, 2008

(65) Prior Publication Data

US 2009/0059302 A1 Mar. 5, 2009

(30) Foreign Application Priority Data

Aug. 30, 2007 (JP) ................. 2007-224729

(51) Int. Cl.
*H04N 1/40* (2006.01)
*G03F 3/08* (2006.01)
*G06K 9/00* (2006.01)
*G06K 9/66* (2006.01)

(52) U.S. Cl. ........ 358/3.03; 358/521; 382/165; 382/194; 382/252

(58) Field of Classification Search ................. 358/3.03, 358/521; 382/165, 194, 252
See application file for complete search history.

(56) References Cited

U.S. PATENT DOCUMENTS 5,426,519 A    6/1995 Banton
7,564,588 B2 * 7/2009 Ogawa et al. ................. 358/3.03
7,656,558 B2 * 2/2010 Kakutani ....................... 358/3.1
2003/0231348 A1   12/2003 Ishii et al.
2007/0188812 A1 * 8/2007 Ohkawa et al. ............... 358/3.03

FOREIGN PATENT DOCUMENTS

JP         1270456        10/1989

(Continued)

OTHER PUBLICATIONS

U.S. Appl. No. 11/939,061, filed Nov. 13, 2007; Image Processor, Image-Processing Method, and Computer-Readable Medium; Arai et al.
U.S. Appl. No. 11/762,908, filed Jun. 14, 2007; Image Processing Apparatus, Image Processing Method Multicolor Image Forming Apparatus, Computer-Readable Medium, and Computer Data Signal; Saito et al.

(Continued)

*Primary Examiner* — Charlotte M Baker
(74) *Attorney, Agent, or Firm* — Gauthier & Connors LLP

(57) ABSTRACT

An image processor includes: a gradation value acquisition unit that acquires a gradation value of a pixel of interest which is a pixel sequentially selected as a target of a binarization process from input image data represented by pixels of M gradations, wherein M≧3; and a pattern determination unit that determines a filling pattern of a group of pixels of output image data corresponding to the pixel of interest according to a corrected gradation value acquired by adding, to the gradation value of the pixel of interest, an error value diffused from a pixel at a periphery of the pixel of interest, wherein the filling pattern includes at least a first pattern in which a predetermined plurality of pixels are filled and which forms a core of a dot and a third pattern in which substantially no pixel is filled and the pattern determination unit determines the filling pattern to be one of the first pattern and the third pattern according to a size relationship between the corrected gradation value and a predetermined threshold value which spatially varies in a periodic manner.

10 Claims, 16 Drawing Sheets

FOREIGN PATENT DOCUMENTS

| | | |
|---|---|---|
| JP | 6098184 | 4/1994 |
| JP | 8079552 | 3/1996 |
| JP | 11146189 | 5/1999 |
| JP | 2000236444 | 8/2000 |
| JP | 2003189099 | 7/2003 |
| JP | 2003348347 | 12/2003 |

OTHER PUBLICATIONS

Notice of Grounds For Rejection from the Japanese Patent Office for Japanese Patent No. 2006-329184 with partial English translation.

Japanese Notice of Grounds for Rejection with English Translation thereof, corresponding to Japanese Application No. 2007-224729 mailed Mar. 2, 2010.

* cited by examiner

|  | 2/64 | 3/64 |
|---|---|---|
|  | 3/64 | 6/64 |
| ERROR DIFFUSION COEFFICIENT | 6/64 | 12/64 | P |
|  | 3/64 | 6/64 | 12/64 |
|  | 2/64 | 3/64 | 6/64 |

FIG. 5

|  | −20 | 10 |
|---|---|---|
|  | 2 | 10 |
| ERROR VALUE | −30 | 5 | P |
|  | 2 | 30 | −40 |
|  | 10 | 20 | 10 |

IMAGE PROCESSOR, IMAGE FORMATION DEVICE, IMAGE PROCESSING METHOD, AND COMPUTER-READABLE MEDIUM

CROSS-REFERENCE TO RELATED APPLICATIONS

This application is based on and claims priority under 35 USC 119 from Japanese Patent Application No. 2007-224729 filed on Aug. 30, 2007.

BACKGROUND

1. Technical Field

The present invention relates to an image processor, an image formation device, an image processing method, and a computer-readable medium.

2. Related Art

According to a known technique, input image data represented by pixels with M (M≧3) gradations are converted to output image data represented with pixels with 2 gradations, through an error diffusion process.

SUMMARY

According to an aspect of the present invention, there is provided an image processor including: a gradation value acquisition unit that acquires a gradation value of a pixel of interest which is a pixel sequentially selected as a target of a binarization process from input image data represented by pixels of M gradations, wherein M≧3; and a pattern determination unit that determines a filling pattern of a group of pixels of output image data corresponding to the pixel of interest according to a corrected gradation value acquired by adding, to the gradation value of the pixel of interest, an error value diffused from a pixel at a periphery of the pixel of interest, wherein the filling pattern includes at least a first pattern in which a predetermined plurality of pixels are filled and which forms a core of a dot and a third pattern in which substantially no pixel is filled and the pattern determination unit determines the filling pattern to be one of the first pattern and the third pattern according to a size relationship between the corrected gradation value and a predetermined threshold value which spatially varies in a periodic manner.

BRIEF DESCRIPTION OF THE DRAWINGS

Exemplary embodiments of the present invention will be described in detail by reference to the following figures, wherein:

FIG. 4 is a diagram showing an example of an error value of a peripheral pixel;

FIG. 5 is a diagram showing an example of a diffusion error coefficient corresponding to a peripheral pixel;

FIG. 14 is a diagram showing an example of a correspondence relationship between a pixel of input image data and a threshold value;

DETAILED DESCRIPTION

Exemplary embodiments of the present invention will now be described with reference to the drawings.

First Exemplary Embodiment

Figure 1:
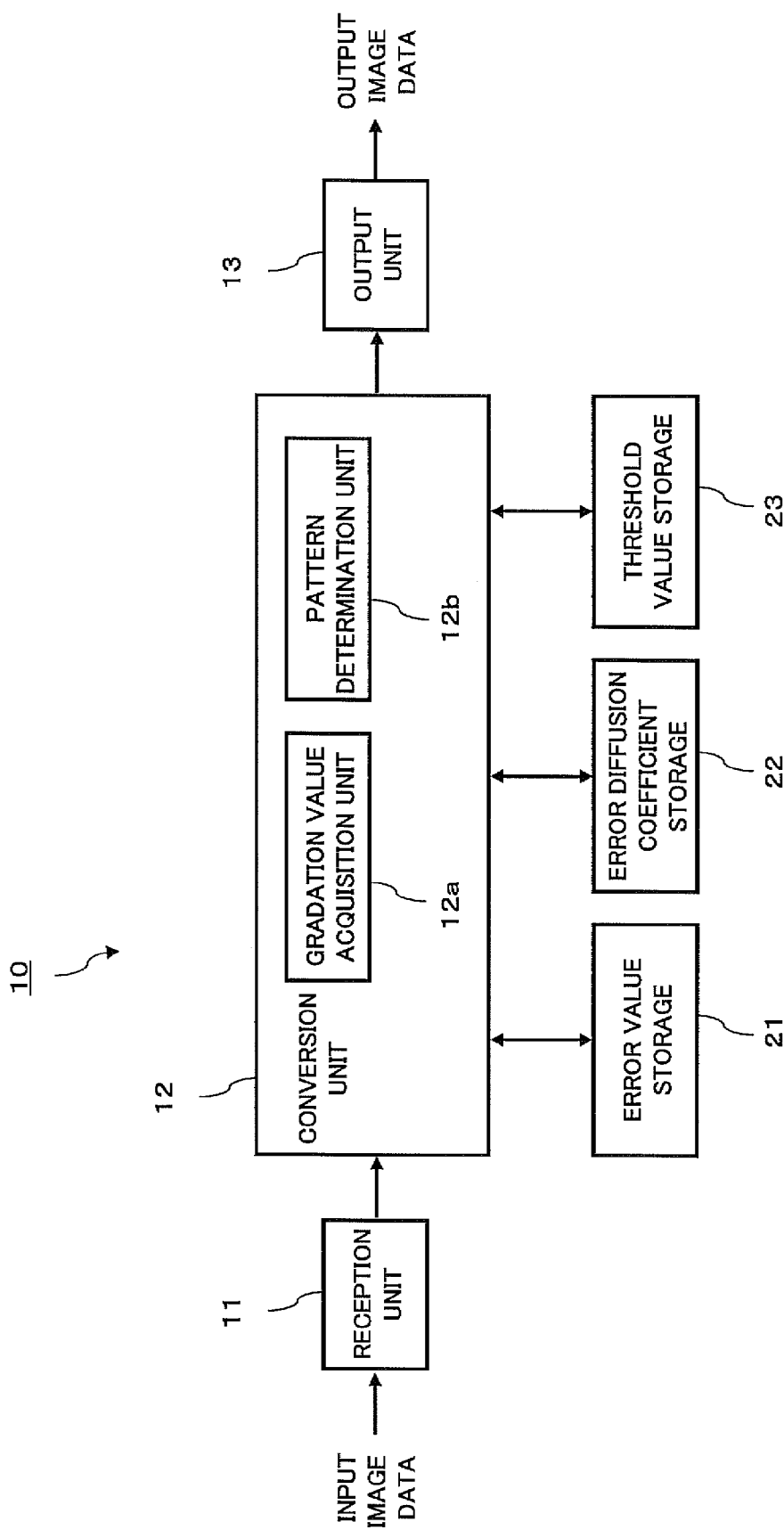
FIG. 1 is a block diagram showing a structure of an image processor according to an exemplary embodiment of the present invention.

FIG. 1 is a block diagram showing a structure of an image processor 10 according to a first exemplary embodiment of the present invention. The image processor 10 converts input image data represented by pixels with M gradations (M≧3) into output image data represented by pixels with two gradations.

Figure 2:
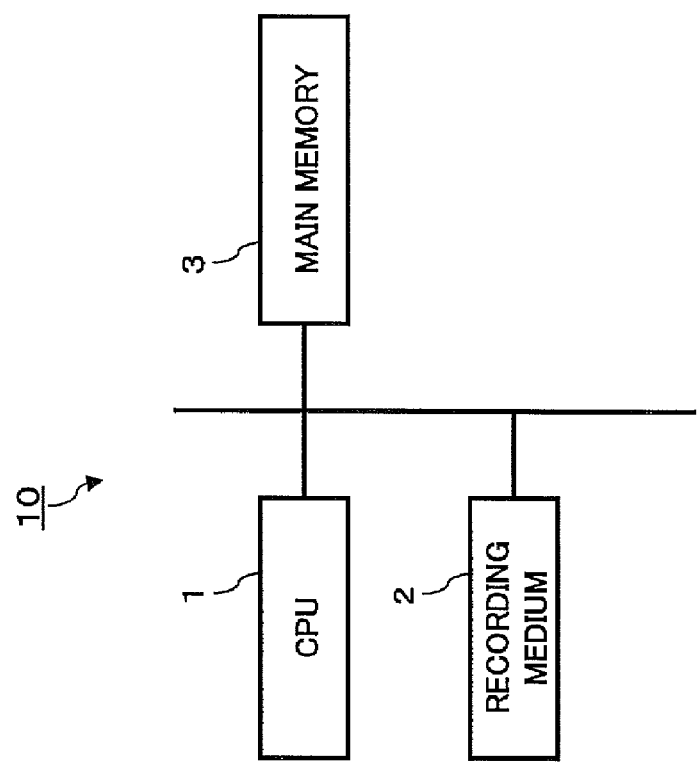
FIG. 2 is a block diagram showing an example of a specific structure of an image processor according to an exemplary embodiment of the present invention.

In one configuration, the image processor 10 is realized by cooperation of a hardware resource and software. For example, as shown in FIG. 2, the image processor 10 includes a CPU (Central Processing Unit) 1, a recording medium 2 such as a ROM (Read Only Memory), and a main memory 3. The functions of the image processor 10 are realized by an image processing program recorded on the recording medium 2 being read into the main memory 3 and executed by the CPU 1. The image processing program may be provided in a recorded form on a recording medium such as a CD-ROM or may alternatively be provided through communication as a data signal. In another configuration, the image processor 10 is realized with only hardware.

In FIG. 1, the image processor 10 has a reception unit 11, a conversion unit 12, and an output unit 13.

The reception unit 11 receives input of input image data represented by pixels of M gradations (M≧3). More specifically, the input image data includes multiple pixels each having a gradation value of M values. The input image data are also called image data represented with multiple values. The reception unit 11 receives input image data using, for example, a RAM (Random Access Memory).

The conversion unit 12 applies a predetermined conversion process to the input image data received by the reception unit 11 and converts the input image data into output image data represented by pixels of two gradations.

The output unit 13 outputs the output image data acquired by the conversion unit 12 to the outside (for example, to another device and another software module). For example, the output unit 13 outputs the output image data to a RAM.

The predetermined conversion process of the conversion unit 12 will now be described.

The conversion unit 12 includes a gradation value acquisition unit 12a and a pattern determination unit 12b.

The gradation value acquiring unit 12a acquires a gradation value of a pixel sequentially selected from the input image data as a target of binarization process (hereinafter referred to as a "pixel of interest").

The "pixel of interest" is, for example, selected from the input image data in which pixels are arranged in a matrix form along a main scan direction and a sub-scan direction, in a predetermined order along the main scan direction and the sub-scan direction.

The pattern determination unit 12b determines a filling pattern of a group of pixels of the output image data corresponding to the pixel of interest according to a corrected gradation value acquired by adding an error value diffused from peripheral pixels of the pixel of interest to the gradation value of the pixel of interest acquired by the gradation value acquisition unit 12a.

The "error value diffused from peripheral pixels of the pixel of interest" is a diffused error in the error diffusion process, and is, in a more specific configuration, an error value acquired by weighting an error value of a pixel in the periphery of the pixel of interest (hereinafter referred to as "peripheral pixel") by a predetermined error diffusion coefficient. The "error value of the peripheral pixel" is an error value between the corrected gradation value of the peripheral pixel and the gradation value represented by the filling pattern determined for the peripheral pixel. For example, the error value of the peripheral pixel is calculated after the determination of the filling pattern when the peripheral pixel is set as the pixel of interest and is stored in an error value storage 21. The "error diffusion coefficient" is a coefficient which is set by reference to a relative position between the pixel of interest and the peripheral pixel, and is set, in one configuration, so that the weight is increased as the distance to the pixel of interest is shortened. The error diffusion coefficient may be, for example, determined in consideration of the gradation reproducibility of the image or the like. For example, the error diffusion coefficient is stored in an error diffusion coefficient storage 22 in advance.

The "corrected gradation value" is a value acquired by adding an error value diffused from the peripheral pixel to the gradation value of the pixel of interest, and is calculated, for example, in the following manner. When the gradation value of the pixel of interest P is Cin, the error values of N (N≧1) peripheral pixels Pn (n=1, 2, ..., N) are En (n=1, 2, ..., N), and the error diffusion coefficients corresponding to the peripheral pixels Pn are Dn (n=1, 2, ..., N), the corrected gradation value Ca can be acquired by the following equation (1).

$$Ca = Cin + \sum_{n=1}^{N} Dn \cdot En \qquad \text{[Equation 1]}$$

For example, the conversion unit 12 reads the error value En of the peripheral pixel from the error value storage 21, reads the error diffusion coefficient Dn from the error diffusion coefficient storage 22, and calculates the corrected gradation value Ca.

The corrected gradation value may include a correction other than the addition of the error value as described above. For example, the corrected gradation value may be a value acquired by adding an error value diffused from the peripheral pixel and a random number to the gradation value of the pixel of interest.

The "group of pixels" is a collection of multiple pixels corresponding to a pixel in the input image data, and is, for example, multiple pixels arranged in a matrix form.

The "filling pattern of the group of pixels" is a pattern characterized by whether or not each pixel of the group of pixels is to be filled. The pixel to be filled is also referred to as a pixel to be colored, an ON pixel, a switched ON pixel, a black pixel, or the like, and is, for example, a pixel with a gradation value of "1". Meanwhile, the pixel which is not filled is also referred to as a non-colored pixel, an OFF pixel, a switched OFF pixel, a white pixel, or the like, and is, for example, a pixel with a gradation value of "0". In the following description, the filled state is referred to as "black" and the non-filled state is referred to as "white".

The filling patterns include a first pattern in which predetermined multiple pixels are filled and which forms a core of a dot, a second pattern in which a number of pixels are filled, the number corresponding to the corrected gradation value, and which forms a dot along with the first pattern, and a third pattern in which substantially no pixel is filled.

The first pattern forms a core of a black dot, and, in the following description, is referred to as a "black core pattern". More specifically, the black core pattern is a pattern in which a predetermined number of pixels at predetermined positions are filled and the other pixels are not filled. The number of filled pixels in the black core pattern defines the minimum size of the black dot and may be set, for example, in consideration of the gradation reproducibility.

The second pattern is a pattern for growing the black dot, and, in the following description, is referred to as a "black growth pattern". More specifically, the black growth pattern is a pattern in which one or more pixels are filled corresponding to the corrected gradation value and the other pixels are not filled, in order to increase a size of the black dot.

The third pattern is an overall white pattern and, in the following description, is referred to as an "all-white pattern". More specifically, the all-white pattern is a pattern in which none of the pixels is filled. However, it is sufficient that the all-white pattern is a pattern in which substantially none of the pixels is filled, and, thus, the all-white pattern may be a pattern in which a small number of pixels are filled in to such a degree as to not have an effect on the image.

From the viewpoint of executing a superior process in a high density region, the filling patterns may include a white core pattern which forms a core of a white dot and a white growth pattern which grows the white dot. Here, the white core pattern is a pattern in which predetermined multiple pixels are not filled, and, more specifically, is a pattern in which a predetermined number of pixels at predetermined positions are not filled and the other pixels are filled. The white growth pattern is a pattern in which a number of pixels are not filled, the number corresponding to the corrected gradation value, and which forms a white dot along with the white core pattern. More specifically, the white growth pattern is a pattern in which one or more pixels are not filled corresponding to the corrected gradation value and the other pixels are filled, in order to increase a size of the white dot.

In addition, from the viewpoint of executing a superior process in the high density region, the filling patterns may include an all black pattern in which substantially all pixels are filled.

The collection of the black pixel of the black core pattern and the black pixel of the black growth pattern and the collection of the white pixel of the white core pattern and the white pixel of the white growth pattern form a black dot and a white dot, respectively, and the collections are also known as "clusters".

The pattern determination unit 12b determines the filling pattern in the following manner.

The pattern determination unit 12b determines the filling pattern to be the black growth pattern when a pixel which is determined as the black core pattern is present among predetermined pixels adjacent to the pixel of interest. Here, the predetermined pixels adjacent to the pixel of interest (hereinafter referred to as "reference pixels") are one or more processed pixels, and the determination of which adjacent pixel of which position of the pixel of interest is to be set as the reference pixel may be made so that the core of the black dot represented by the black core pattern is grown by the black growth pattern.

The pattern determination unit 12b determines the filling pattern to be the black core pattern or the all-white pattern according to a size relationship between the corrected gradation value and a predetermined threshold value when no pixel in the reference pixels is determined as the black core pattern. More specifically, the pattern determination unit 12b determines the filling pattern to be the all-white pattern when the corrected gradation value is less than the predetermined threshold value and to be the black core pattern when the corrected gradation value is greater than or equal to the predetermined threshold value.

The determination of whether or not there is a pixel determined as the black core pixel in the reference pixels is made, for example, in the following manner.

In one configuration, the pattern determination unit 12b refers to the pixel value of the pixel of the output image data. When a group of pixels of the black core pattern is present among the groups of pixels corresponding to the reference pixels, the pattern determination unit 12b determines that there is a pixel determined as the black core pattern in the reference pixels. When, on the other hand, there is no group of pixels of the black core pattern, the pattern determination unit 12b determines that there is no pixel determined as the black core pattern in the reference pixels.

In another configuration, the pattern determination unit 12b records, in correspondence to each pixel of the input image data, a type of the filling pattern determined for the pixel as a determination result and refers to the determination result to determine whether or not there is a pixel determined as the black core pattern in the reference pixels.

In the exemplary embodiment, from the viewpoint of acquiring an image with a superior graininess by imparting a periodicity to the arrangement of the dot, the predetermined threshold value is spatially varied in a periodic manner. In other words, the threshold value which is used for determination of whether or not the black core pattern is to be generated spatially varies in a periodic manner. For example, a threshold value matrix in which multiple threshold values are placed is prepared in advance, and the threshold values of the threshold matrix are sequentially used as the above-described predetermined threshold value. For example, a pattern of the threshold values which spatially varies in a periodic manner (for example, a threshold value matrix) is stored in a threshold value storage 23 in advance, and the conversion unit 12 reads, from the threshold value storage 23, a threshold value corresponding to the position of the pixel of interest in the input image data and uses the read threshold value.

In a specific configuration of a process for determining the filling pattern, the filling pattern is determined in the following manner.

(1) When a pixel determined as the black core pattern is present among the reference pixels and the corrected gradation value is less than a first threshold value Th1, the filling pattern is determined to be the black growth pattern.

(2) When no pixel determined as the black core pattern is present among the reference pixels and the corrected gradation value is less than the first threshold value Th1, the filling pattern is determined to be the all-white pattern if the corrected gradation value is less than a second threshold value Th2 (which is less than Th1) and to be the black core pattern if the corrected gradation value is greater than or equal to the second threshold value Th2.

(3) When a pixel determined as a white core pattern is present among the reference pixels and the corrected gradation value is greater than or equal to the first threshold value Th1, the filling pattern is determined to be the white growth pattern.

(4) When no pixel determined as the white core pattern is present among the reference pixels and the corrected gradation value is greater than or equal to the first threshold value Th1, the filling pattern is determined to be the all-black pattern if the corrected gradation value is greater than or equal to a third threshold value (which is greater than Th1) and to be the white core pattern if the corrected gradation value is less than the third threshold value Th3.

In this configuration, the second threshold value Th2 spatially varies in a periodic manner. In one configuration, the third threshold value Th3 also spatially varies in a periodic manner, but may be a fixed value. The first threshold value Th1 is, for example, a fixed value, but may vary.

For the high-density region (for example, in a case in which the corrected gradation value is greater than or equal to the first threshold value Th1), the binarization method is not limited to that described above, and another binarization method may be used.

Figure 3:
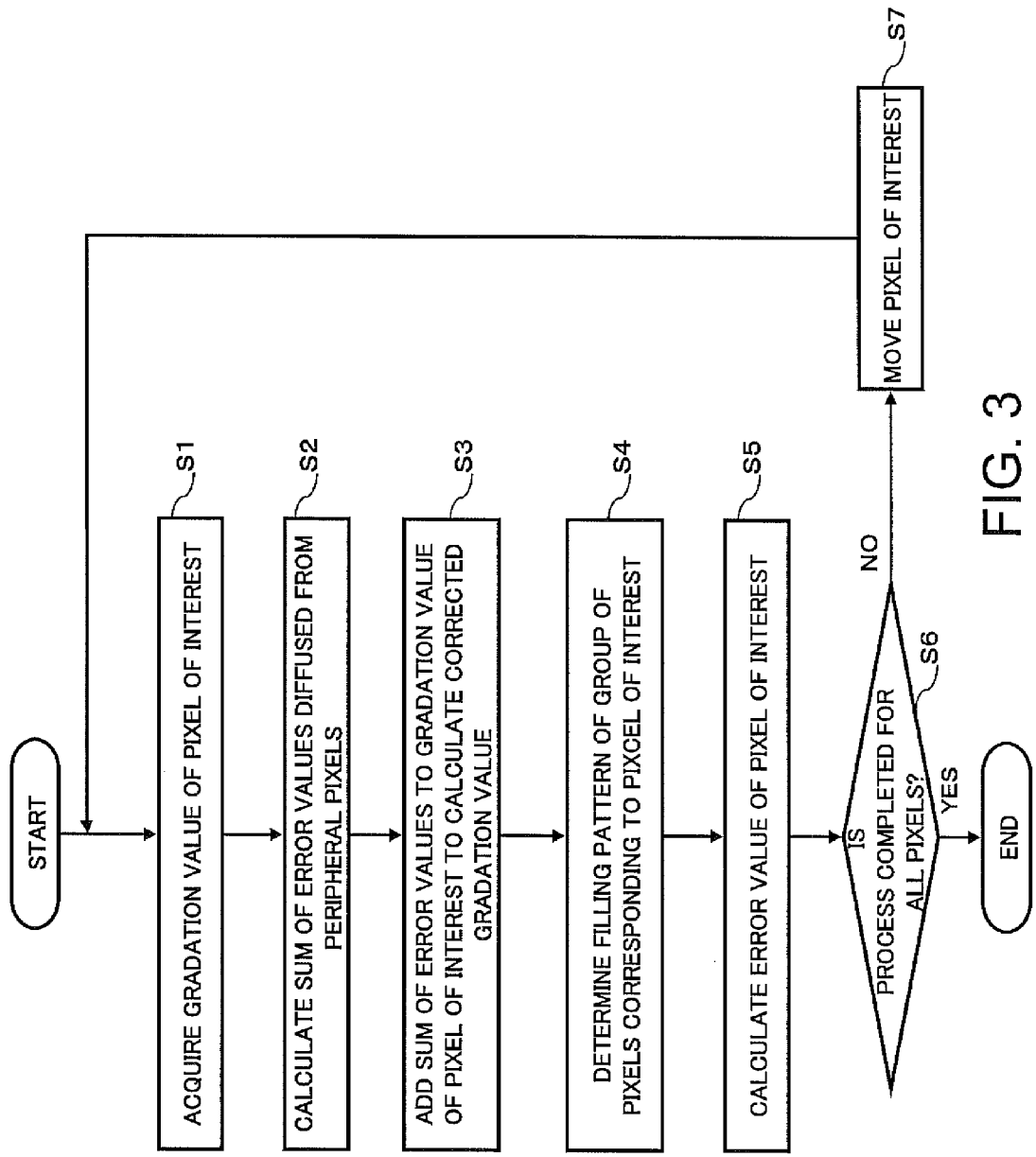
FIG. 3 is a flowchart showing an example of a conversion process in an exemplary embodiment of the present invention.

FIG. 3 is a flowchart showing an example conversion process in the exemplary embodiment. An example conversion process will now be described with reference to FIG. 3.

In this example process, the input image data are image data having a resolution of 600×600 dpi and a number of gradations per pixel of 256 (with gradation values of 0-255). The output image data are image data having a resolution of 2400×2400 dpi and a number of gradations per pixel of 2 (with gradation values of 0-1). The group of pixels of the output image data corresponding to a pixel of the input image data is a group of pixels of 4×4 matrix, and the output image data includes 600×600 groups of pixels.

As shown in FIG. 3, the conversion unit 12 acquires the gradation value Cin of the pixel of interest among the input image data (S1).

Then, the conversion unit 12 calculates a sum A of the error values diffused from the peripheral pixels to the pixel of interest (S2). For example, the error values of the multiple pixels in the periphery of the pixel of interest P are those shown in FIG. 4 and the error diffusion coefficients for the multiple pixels in the periphery of the pixel of interest P are those shown in FIG. 5. The sum A is calculated in the following manner.

$$A = 10 \times 2/64 + 2 \times 3/64 - 30 \times 6/64 + 2 \times 3/64 - 20 \times 2/64 + 20 \times 3/64 + 30 \times 6/64 + 5 \times 12/64 + 10 \times 6/64 + 10 \times 3/64 + 10 \times 6/64 - 40 \times 12/64$$

Next, the conversion unit 12 adds the sum A to the gradation value Cin of the pixel of interest to calculate the corrected gradation value Ca (=Cin+A) (S3).

Then, the conversion unit 12 determines the filling pattern of the group of pixels corresponding to the pixel of interest based on the corrected gradation value Ca and the patterns of the reference pixels (S4).

Figure 7:
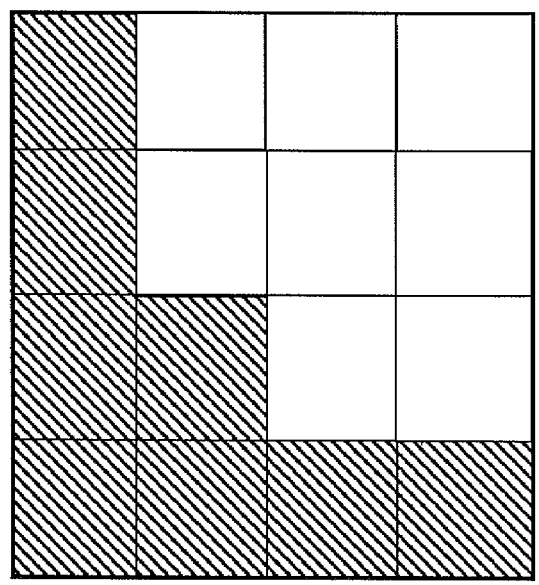
FIG. 7 is a diagram showing an example of a white core pattern.
Figure 6:
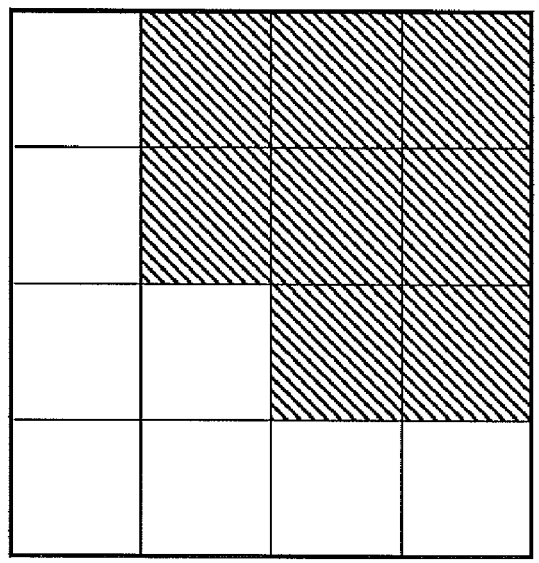
FIG. 6 is a diagram showing an example of a black core pattern.

In the present example process, the filling pattern is determined to be one of the all-white pattern, the black core pattern, the black growth pattern, the all-black pattern, the white core pattern, and the white growth pattern. As shown in FIG. 6, the black core pattern is a pattern in which 8 pixels at the bottom right corner among the group of pixels are filled. As shown in FIG. 7, the white core pattern is a pattern in which 8 pixels at the bottom right among the group of pixels are not filled.

Figure 8:
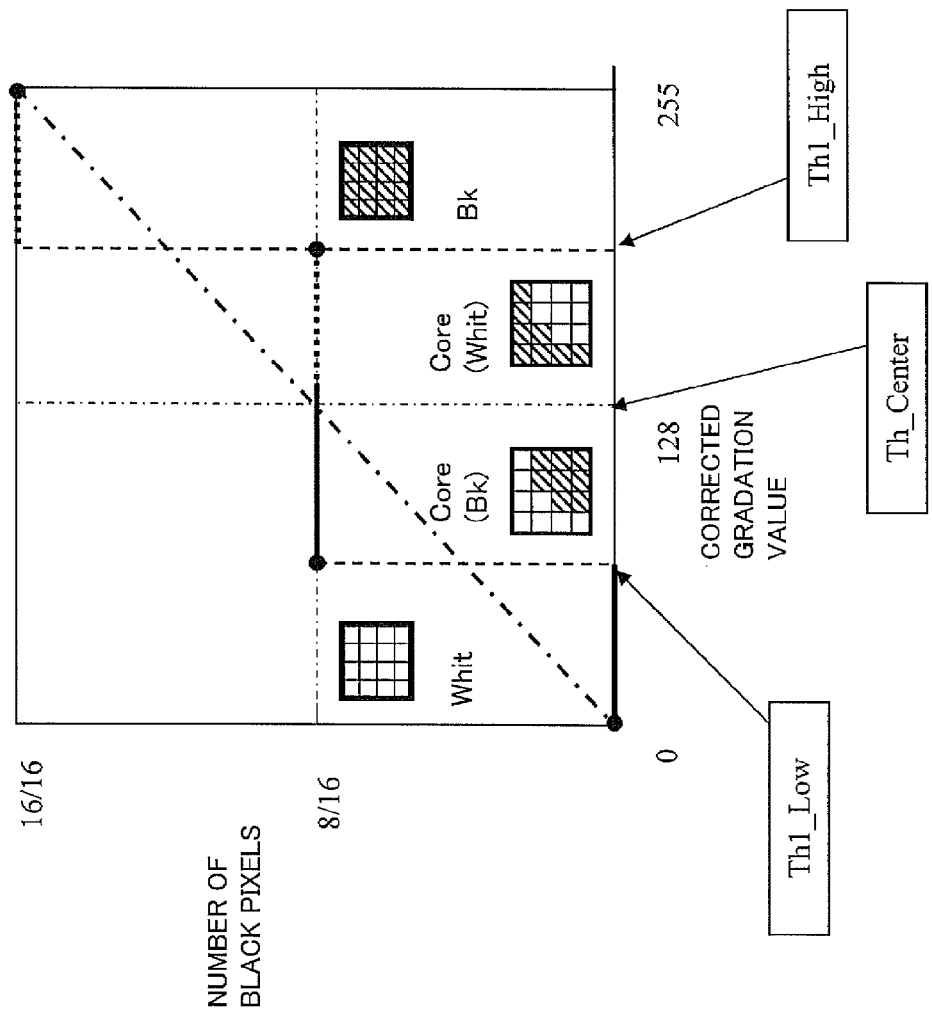
FIG. 8 is a diagram showing a first determination map.
Figure 9:
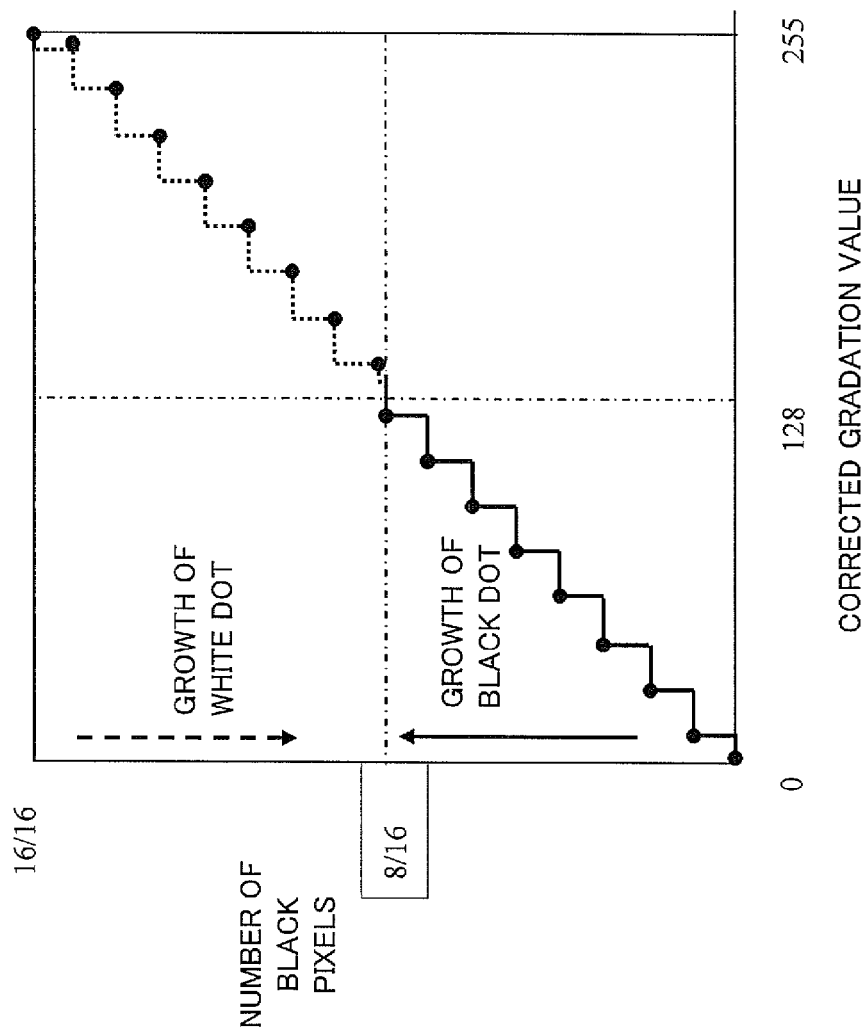
FIG. 9 is a diagram showing a second determination map.

In addition, in the present example process, the filling pattern is determined by, reference to a first determination map shown in FIG. 8 and a second determination map shown in FIG. 9.

Moreover, in the present example process, the reference pixels are processed pixels adjacent to the pixel of interest to the left, above, and to the upper left.

Figure 10:
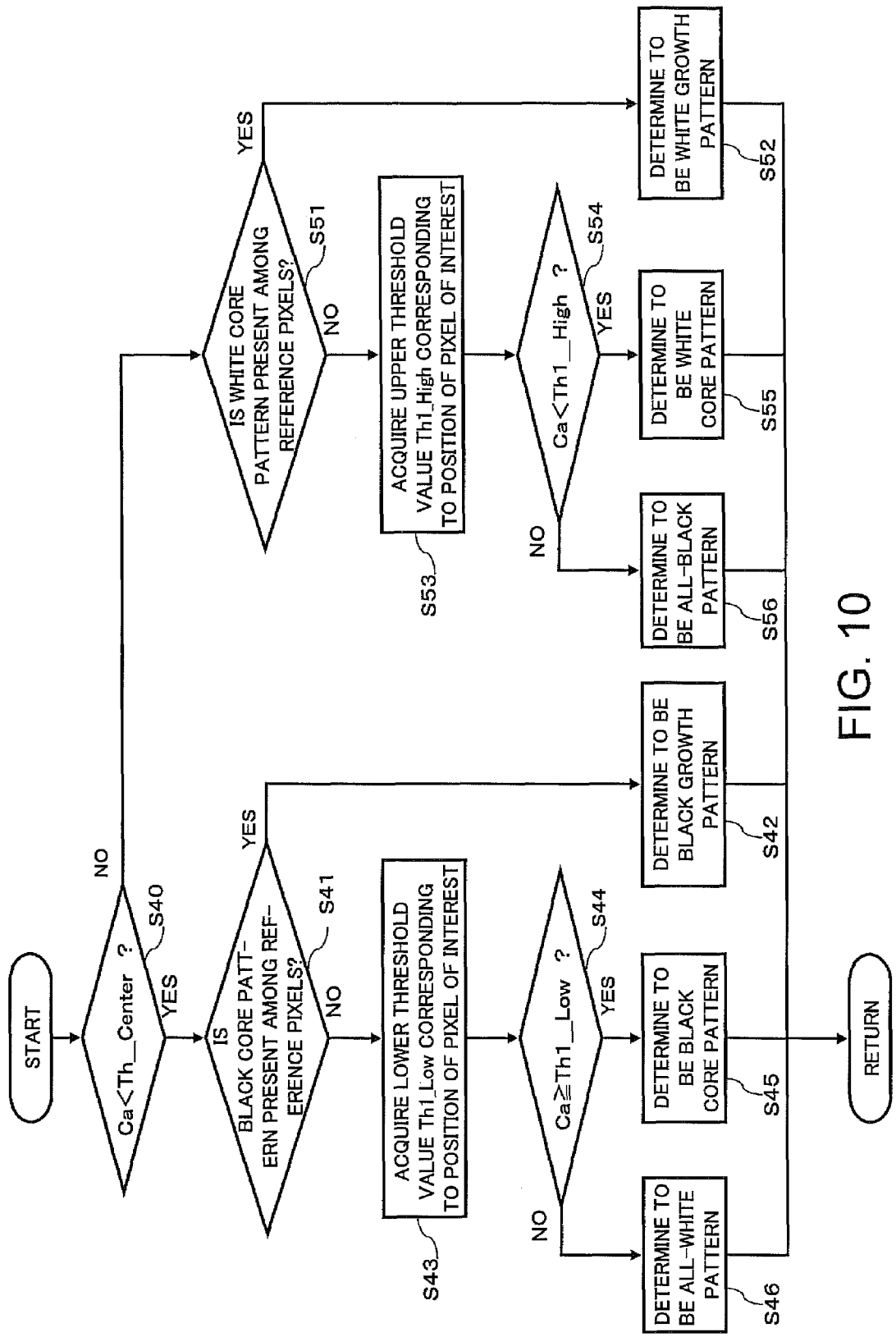
FIG. 10 is a flowchart showing an example of a process for determining a filling pattern.

FIG. 10 is a flowchart showing an example of the process for determining the filling pattern; that is, an example of the process of step S4 of FIG. 3.

In FIG. 10, the conversion unit 12 determines whether or not the corrected gradation value Ca is less than a center threshold value Th_Center (S40).

When it is determined that the corrected gradation value Ca is less than the center threshold value Th_Center (S40: YES), the conversion unit 12 determines whether or not there is a group of pixels of the black core pattern in the groups of pixels of the output image data corresponding to the three reference pixels adjacent to the pixel of interest (S41).

Figure 11:
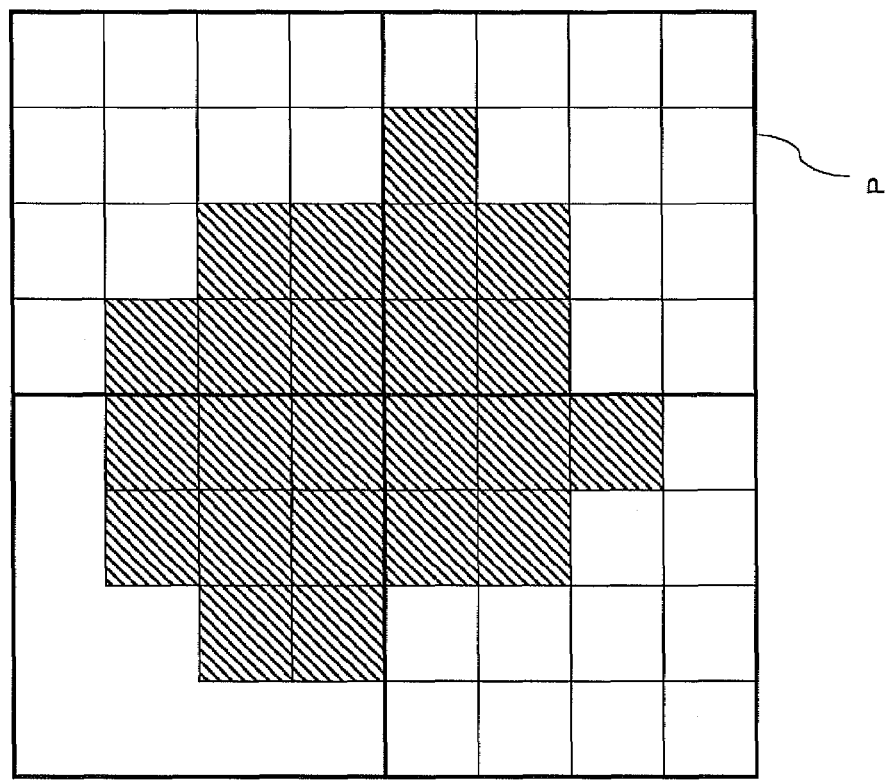
FIG. 11 is a diagram showing an example in which a pixel of interest is converted to a black growth pattern when a group of pixels corresponding to a reference pixel above and to the left of the pixel of interest is a group of pixels of a black core pattern.

When it is determined that there is a group of pixels of the black core pattern (S41: YES), the conversion unit 12 determines the filling pattern of the pixel of interest to be the black growth pattern (S42). Here, the number of black pixels to be filled in the black growth pattern is determined according to the second determination map of FIG. 9 and based on the corrected gradation value Ca, and is increased for a larger corrected gradation value Ca. FIG. 11 shows an example in which the pixel of interest P is converted to the black growth pattern when the group of pixels corresponding to the upper left reference pixel of the pixel of interest P is the group of pixels of the black core pattern. In FIG. 11, the black dot is formed by a black pixel of the black core pattern and the black pixel of the black growth pattern adjacent to the black core pattern.

Figure 13:
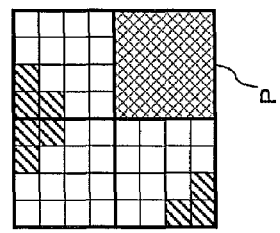
FIG. 13 is a diagram showing an example of a threshold value matrix.
Figure 12:
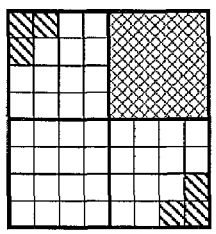
FIG. 12 is a diagram showing an example list when no group of pixels of a black core pattern is present among the groups of pixels corresponding to three reference pixels adjacent to the pixel of interest.
Figure 12:
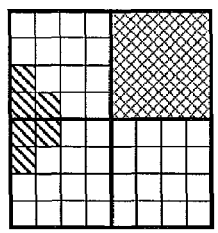
Figure 12:
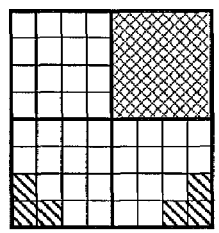
Figure 12:
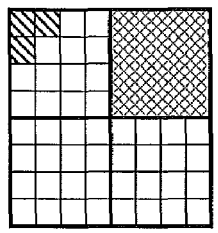
Figure 12:
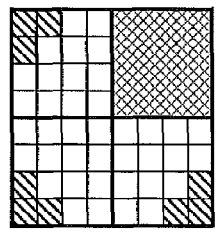
Figure 12:
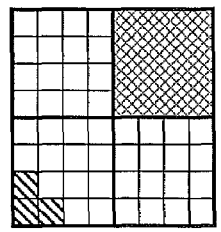
Figure 12:
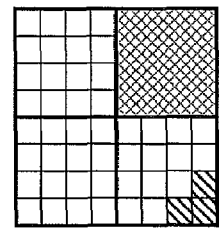
Figure 12:
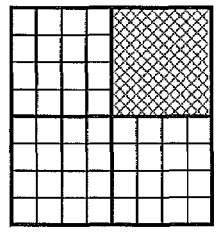
Figure 12:
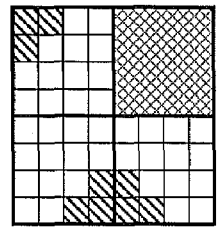
Figure 12:
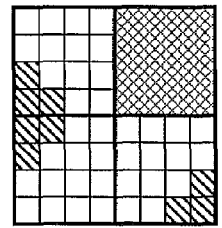
Figure 12:
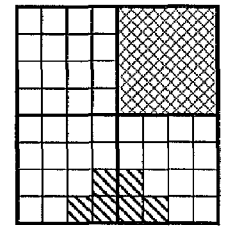
Figure 14:
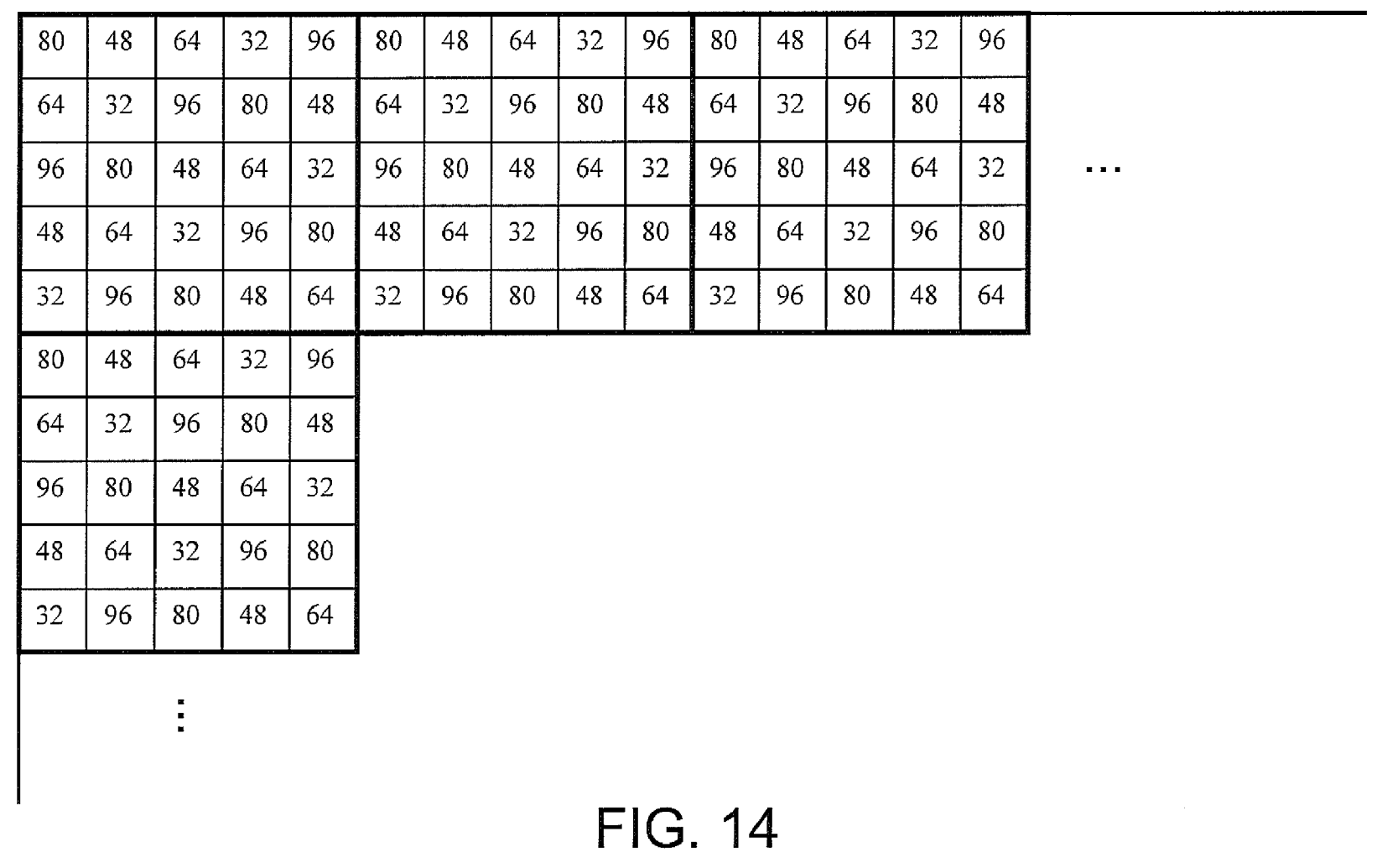

When, on the other hand, it is determined that there is no group of pixels of the black core pattern (S41: NO), for example, when there is no group of pixels of the black core pattern in the groups of pixels corresponding to the three reference pixels adjacent to the pixel of interest P as shown in FIG. 12, the conversion unit 12 acquires a lower threshold value Th1_Low corresponding to the position of the pixel of interest in the input image data (S43). More specifically, a threshold value matrix for the lower threshold values as shown in FIG. 13 is stored in the threshold value storage 23 in advance, and the conversion unit 12 reads, from the threshold value storage 23 and as the lower threshold value Th1_Low, a threshold value corresponding to the position of the pixel of interest from among the threshold values in the threshold value matrix for the lower threshold value. FIG. 14 shows a correspondence relationship between the pixel of the input image data and the threshold value. In FIG. 14, each cell indicates a pixel and the value in the cell shows a threshold value corresponding to the pixel represented by the cell. As shown in FIG. 14, the threshold value matrix is repeatedly used on the input image data.

The conversion unit 12 then determines whether or not the corrected gradation value Ca is greater than or equal to the lower threshold value Th1_Low (S44).

When it is determined that the corrected gradation value Ca is greater than or equal to the lower threshold value Th1_Low (S44: YES), the conversion unit 12 determines the filling pattern of the pixel of interest to be the black core pattern (S45).

When, on the other hand, it is determined that the corrected gradation value Ca is less than the lower threshold value Th1_Low (S44: NO), the conversion unit 12 determines the filling pattern of the pixel of interest to be the all-white pattern (S46).

When it is determined in step S40 that the corrected gradation value Ca is not less than the center threshold value Th_Center (S40: NO), the conversion unit 12 determines whether or not there is a group of pixels of the white core pattern in the groups of pixels of the output image data corresponding to the three reference pixels adjacent to the pixel of interest (S51).

Figure 15:
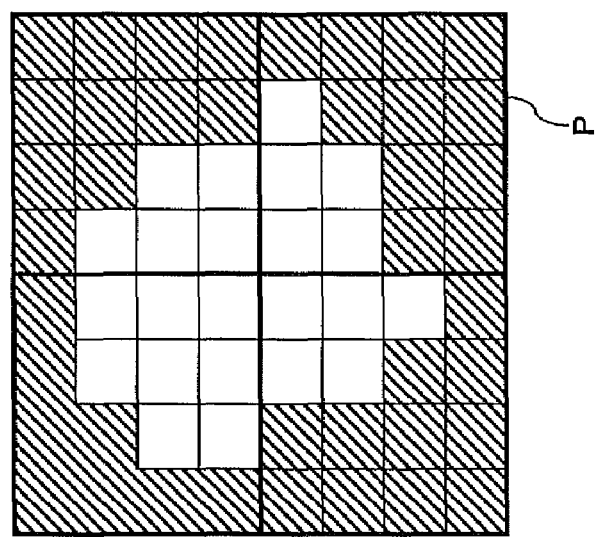
FIG. 15 is a diagram showing an example in which a pixel of interest is converted to a white growth pattern when a group of pixels corresponding to the reference pixel above and to the left of the pixel of interest is a group of pixels of a white core pattern.

When it is determined that there is a group of pixels of the white core pattern (S51: YES), the conversion unit 12 determines the filling pattern of the pixel of interest to be the white growth pattern (S52). Here, the number of white pixels which are not filled in the white growth pattern is determined according to the second determination map of FIG. 10 and based on the corrected gradation value Ca, and is increased for a smaller corrected gradation value Ca. FIG. 15 shows an example in which the pixel of interest P is converted to the white growth pattern when the group of pixels corresponding to the reference pixel at the upper left of the pixel of interest P is a group of pixels of the white core pattern. In FIG. 15, the white dot is formed by a white pixel of the white core pattern and a white pixel of the white growth pattern adjacent to the white core pattern.

Figure 16:
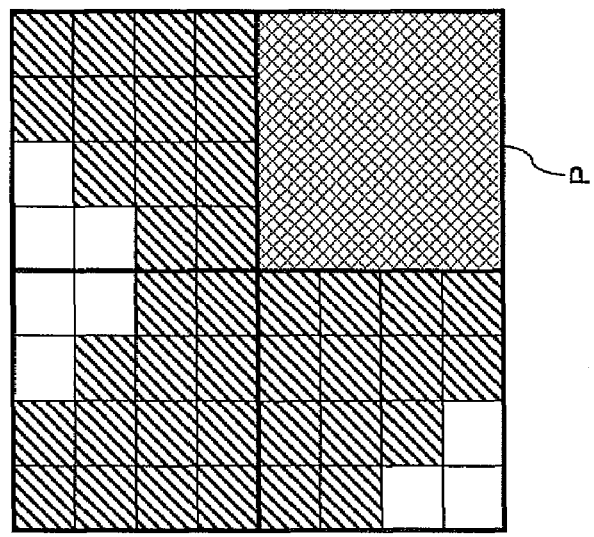
FIG. 16 is a diagram showing an example when no group of pixels of a white core pattern is present among the groups of pixels corresponding to three reference pixels adjacent to the pixel of interest.

When, on the other hand, it is determined that there is no group of pixels of the white core pattern (S51: NO); for example, when there is no group of pixels of the white core pattern in the groups of pixels corresponding to the three reference pixels adjacent to the pixel of interest P as shown in FIG. 16, the conversion unit 12 acquires an upper threshold value Th1_High corresponding to the position of the pixel of interest in the input image data (S53). More specifically, a threshold matrix for the upper threshold value is stored in the threshold value storage 23 in advance, and the conversion unit 12 reads, from the threshold value storage 23 and as the upper threshold value Th1_High, a threshold value corresponding to the position of the pixel of interest from among the threshold values in the threshold value matrix for the upper threshold value.

The conversion unit 12 then determines whether or not the corrected gradation value Ca is less than the upper threshold value Th1_High (S54).

When it is determined that the corrected gradation value Ca is less than the upper threshold value Th1_High (S54: YES), the conversion unit 12 determines the filling pattern of the pixel of interest to be the white core pattern (S55).

When, on the other hand, it is determined that the corrected gradation value Ca is not less than the upper threshold value Th1_High (S54: NO), the conversion unit 12 determines the filling pattern of the pixel of interest to be the all-black pattern (S56).

Referring again to FIG. 3, after the filling pattern is determined in step S4, the conversion unit 12 calculates, as the error value of the pixel of interest, a value in which the gradation value indicated in the filling pattern of the pixel of interest is subtracted from the corrected gradation value Ca of the pixel of interest (S5). More specifically, the gradation value indicated in the filling pattern is the gradation value based on an area ratio of the black pixel in the overall group of pixels. For example, when the number of filling in the filling pattern of the pixel of interest is k ($0 \leq k \leq 16$), the error value E of the pixel of interest is calculated by $E=Ca-16 \times k$. The conversion unit 12 stores the calculated error value in the error value storage 21.

The conversion unit 12 then determines whether or not the process is completed for all pixels of the input image data (S6).

When it is determined that the process is not completed (S6: NO), the conversion unit 12 moves the pixel of interest (S7) and returns the process to step S1.

When, on the other hand, it is determined that the process is completed for all pixels (S6: YES), the conversion process is completed.

In this manner, the filling pattern of the group of pixels of the output image data corresponding to each pixel of the input image data is determined and the output image data including the collection of the groups of pixels having the gradation value patterns defined by the filling patterns are acquired.

Second Exemplary Embodiment

An image processor according to a second exemplary embodiment of the present invention will now be described. The image processor of the second exemplary embodiment is very similar to the image processor of the first exemplary embodiment, and, thus, the portions of the image processor that are identical to those in the first exemplary embodiment are assigned the same reference numerals and their repeated descriptions are omitted.

In the second exemplary embodiment, from the viewpoint of acquiring a dot image having a superior periodicity, at least one of the number of predetermined multiple pixels in the black core pattern (that is, the number of pixels to be filled) and the number corresponding to the corrected gradation value in the black growth pattern (that is, the number of pixels to be filled) varies according to the gradation value of the pixel of interest so that the number becomes smaller as the density becomes smaller.

More specifically, when the conversion unit 12 determines the filling pattern of the pixel of interest to be the black core pattern, the conversion unit 12 determines the number of pixels to be filled according to the gradation value of the pixel of interest. For example, a table showing a correspondence relationship between the gradation value and the number of pixels to be filled is prepared in advance and the conversion unit 12 reads from the table a number corresponding to the gradation value of the pixel of interest.

In addition to or in place of the above-described process, the conversion unit 12 may determine, when the conversion unit 12 determines the filling pattern of the pixel of interest to be the black growth pattern, the number of the pixels to be filled according to the gradation value of the pixel of interest. For example, in one configuration, a table showing a correspondence relationship between the gradation value and a correction number is prepared in advance, and the conversion unit 12 reads, from the table, a correction number corresponding to the gradation value of the pixel of interest, adds the correction number to the number determined by the second determination map, and acquires the number of pixels to be filled. In another configuration, multiple types of second determination maps are prepared in advance, and the conversion unit 12 selects a second determination map corresponding to the gradation value of the pixel of interest, and determines the number of pixels to be filled based on the selected second determination map.

From the viewpoint of imparting superior periodicity to the black dot in the low-density region (for example, a region in which the density value is greater than or equal to 0% and less than 50%), an ideal size SB of the black dot is determined by a relationship between the resolution D (dpi) of the output image data, a number of lines L of the dot (lpi) determined by the pattern of the threshold value (for example, the threshold value matrix), and the density value C (%) of the input image data, and is represented by the following equation. The number of lines L determined by the threshold value matrix of FIG. 13 is 268 lpi.

$$SB = \left(\frac{D}{L}\right)^2 \times \frac{C}{100} \qquad \text{[Equation 2]}$$

If a significant difference exists between the size of the black dot acquired by the conversion process based on the input image data and the ideal size of the black dot as described above, the periodicity of the dot may be destroyed.

In consideration of this, in one specific configuration, at least one of the number of pixels to be filled in the black core pattern and the number of pixels to be filled in the black growth pattern is set so that the size of the black dot acquired by the conversion process based on the input image data is close to, the same as, or approximately the same as the above-described ideal size of the black dot.

In addition, in one configuration in the exemplary embodiment, from the viewpoint of acquiring a dot image having a superior periodicity in the high-density region, at least one of the number of the predetermined multiple pixels in the white core pattern (that is, the number of pixels to not be filled) and the number according to the corrected gradation value in the white growth pattern (that is, the number of pixels to not be filled) varies according to the gradation value of the pixel of interest so that the number is decreased as the density is increased.

More specifically, when the conversion unit 12 determines the filling pattern of the pixel of interest to be the white core pattern, the conversion unit 12 determines the number of pixels to not be filled based on the gradation value of the pixel of interest. For example, the conversion unit 12 reads, from a table which is prepared in advance, the number of pixels to not be filled corresponding to the gradation value of the pixel of interest.

In addition to or in place of the above-described process, the conversion unit 12 may determine, when the conversion unit 12 determines the filling pattern of the pixel of interest to be the white growth pattern, the number of pixels to not be filled according to the gradation value of the pixel of interest. For example, in one configuration, the conversion unit 12 reads a correction number corresponding to the gradation value of the pixel of interest from a table which is prepared in advance, adds the correction number to the number determined by the second determination map, and acquires the number of pixels to not be filled. In another configuration, the conversion unit 12 selects a second determination map corresponding to the gradation value of the pixel of interest from among multiple types of second determination maps, and determines the number of pixels to not be filled based on the selected second determination map.

From the viewpoint of imparting superior periodicity to the white dot in the high-density region (for example, a region in which the density value is greater than or equal to 50% and less than or equal to 100%), an ideal size SW of the white dot is determined by a relationship of the resolution D (dpi) of the output image data, a number of lines L (lpi) of the dot determined by the pattern of the threshold value (for example, the threshold value matrix), and the density value C (%) of the input image data, and is represented by the following equation.

$$SW = \left(\frac{D}{L}\right)^2 \times \frac{(100-C)}{100} \qquad \text{[Equation 3]}$$

If a significant difference exists between the size of the white dot acquired by the conversion process based on the input image data and the above-described ideal size of the white dot, the periodicity of the dot may be destroyed.

In consideration of this, in a specific configuration, at least one of the number of pixels to not be filled in the white core pattern and the number of pixels to not be filled in the white growth pattern is set so that the size of the white dot acquired by the conversion process based on the input image data is close to, the same as, or approximately the same as the ideal size of the white dot.

Third Exemplary Embodiment

An image processor according to a third exemplary embodiment of the present invention will now be described. The image processor of the third exemplary embodiment is similar to the image processor of the second exemplary embodiment, and, thus, the portions that are identical to those in the second exemplary embodiment are assigned the same reference numerals and their repeated descriptions are omitted.

In the third exemplary embodiment, from the viewpoint of acquiring a superior gradation reproducibility, when the predetermined multiple at least in the black core pattern varies according to the gradation value of the pixel of interest, the predetermined multiple is a fixed value in the low-density region in which the gradation value of the pixel of interest is less than a predetermined value.

The fixed value is a value which defines a minimum size of the black dot, and may be set from the viewpoint of acquiring superior gradation reproducibility.

More specifically, in the present exemplary embodiment, the predetermined multiple in the black core pattern (number of pixels to be filled) is set to a fixed value in the low-density region in which the gradation value of the pixel of interest is less than the predetermined value so that superior gradation reproducibility can be acquired and is varied according to the gradation value of the pixel of interest in the density region in which the gradation value of the pixel of interest is greater than or equal to the predetermined value so that a superior periodicity of the dot can be acquired.

Figure 17:
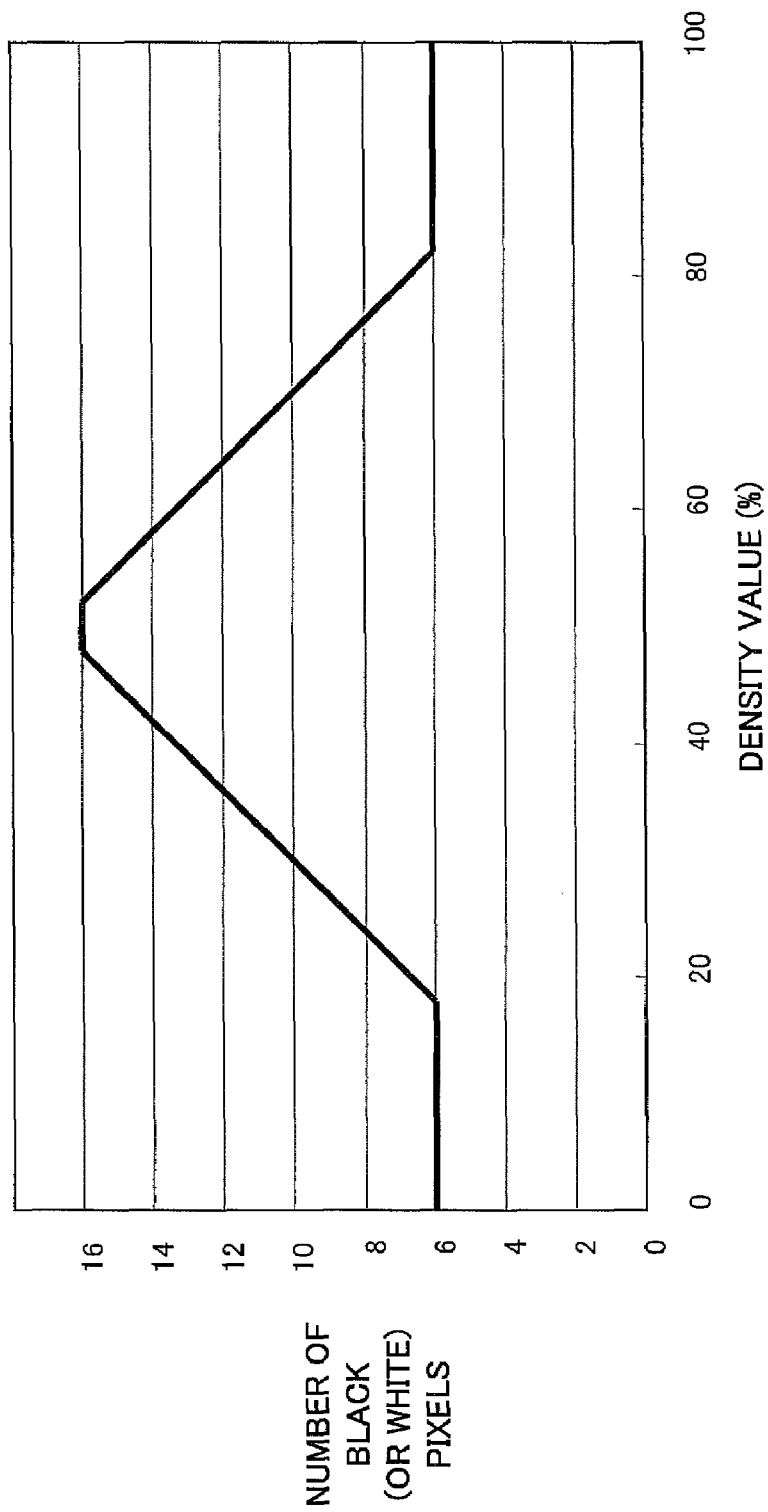
FIG. 17 is a diagram showing an example setting of a correspondence relationship between a density value of the pixel of interest and a number of black pixels in a black core pattern or a number of white pixels in a white core pattern.

FIG. 17 is a diagram showing an example setting of a correspondence relationship between the density value of the pixel of interest and the number of black pixels in the black core pattern or the number of white pixels in the white core pattern. In FIG. 17, in the density region with a density value of greater than or equal to 0% and less than 50%, the number of black pixels in the black core pattern is defined, and, in the density region with a density value of greater than or equal to 50% and less than or equal to 100%, the number of white pixels in the white core pattern is defined. This example setting configuration is an example in which the size of the dot is adjusted by varying the number of the black pixels in the black core pattern and the number of white pixels in the white core pattern in the case in which the output resolution D is 2400 dpi and the number of lines L of the dot determined by the pattern of the threshold value is 268 lpi. The relationship between the density value C (%) of the pixel of interest and the gradation value G (0-255) of the pixel of interest is represented, for example, by C=G·(100/255).

Figure 18:
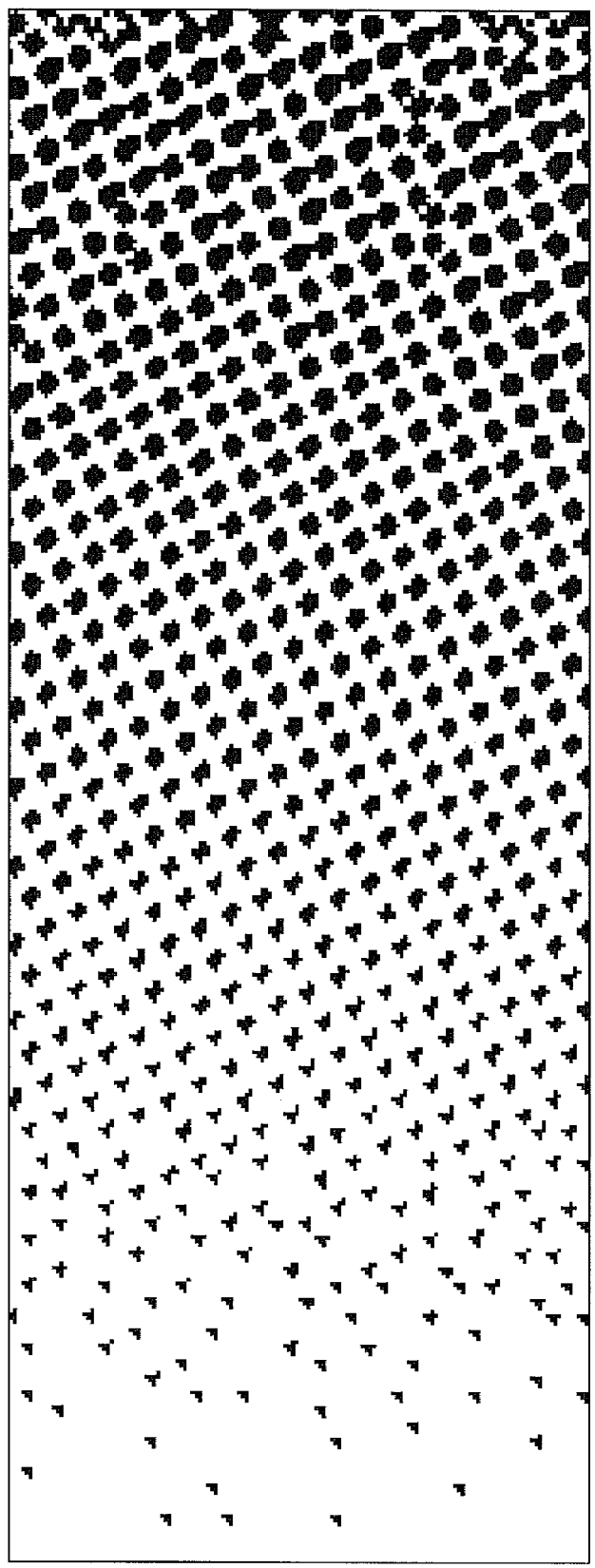
FIG. 18 is a diagram showing an example of a result of the binarization process in a third exemplary embodiment.

When input image data with multiple values representing a gradation image in which the density value gradually changes from 0% to 50% were binarized by the image conversion process of the third exemplary embodiment using the threshold value matrix of FIG. 13 and the setting of FIG. 17, output image data shown in FIG. 18 were acquired.

Figure 19:
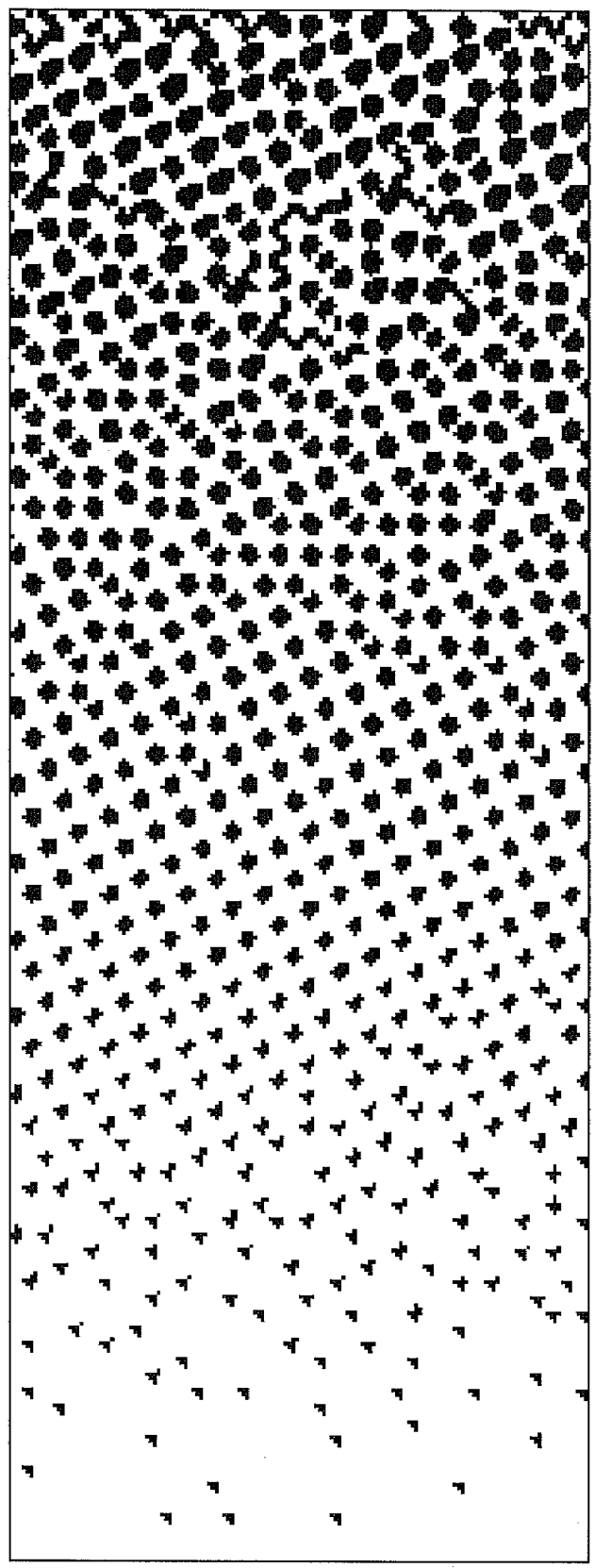
FIG. 19 is a diagram showing an example of a result of the binarization process in a comparative example.

As a comparative example, when the above-described input image data of multiple values representing the gradation image were binarized through the image conversion process of the first exemplary embodiment using the threshold value matrix of FIG. 13 and without varying the number of black pixels in the black core pattern, output image data shown in FIG. 19 were acquired.

In comparison to the image of the comparative example shown in FIG. 19, in the image produced by the third exemplary embodiment shown in FIG. 18, superior periodicity of the dot was acquired.

The image processors according to the first through third exemplary embodiments of the present invention can be applied to various usages, and are, for example, applied to an image formation device (such as a printer or a copier).

Figure 20:
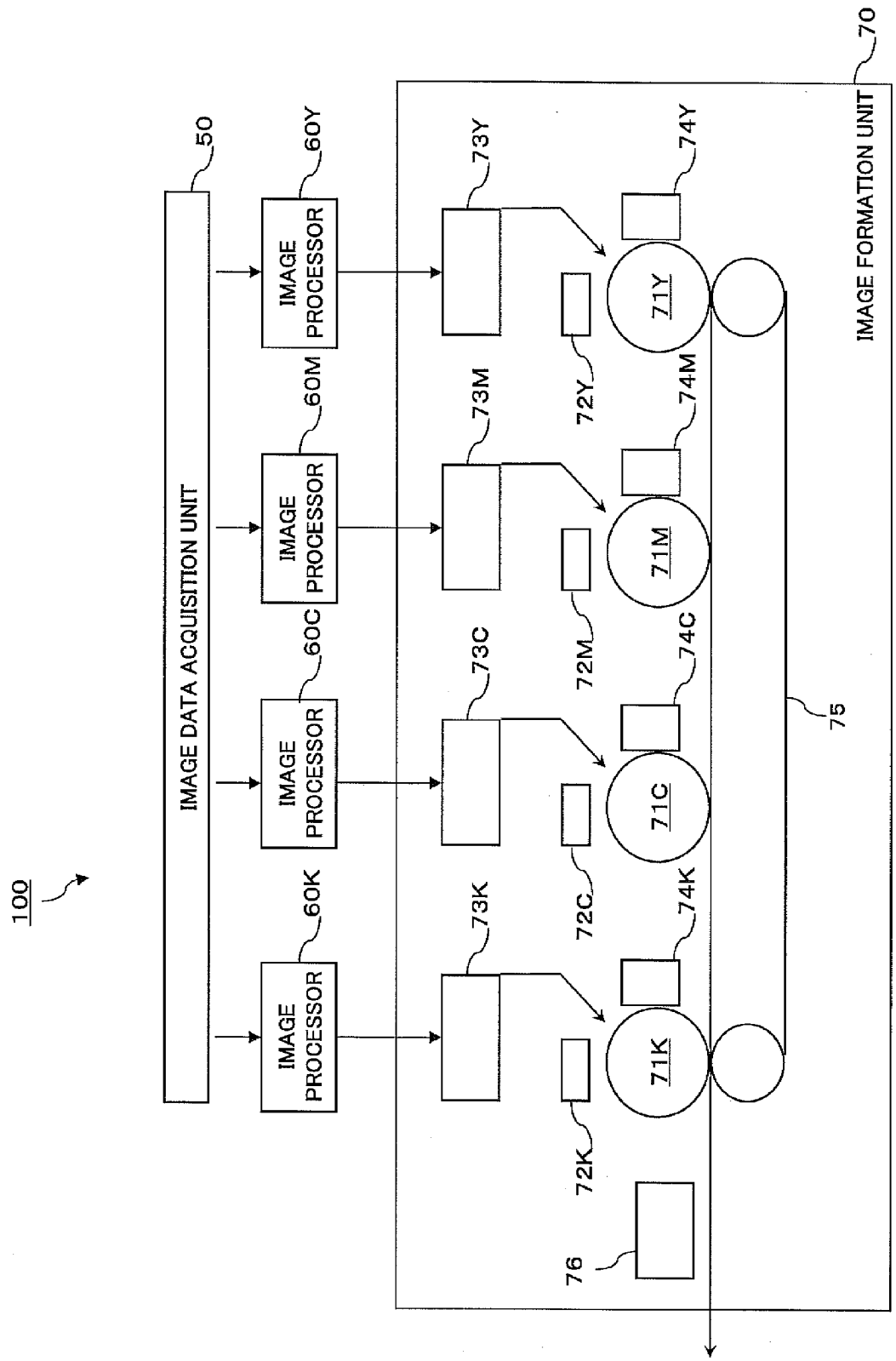
FIG. 20 is a schematic structural diagram showing a structure of an image formation device including an image processor according to an exemplary embodiment of the present invention.

FIG. 20 is a schematic structural diagram showing a structure of an image formation device 100 including an image processor according to an exemplary embodiment of the present invention. The image formation device 100 is a device which forms an image on a recording medium such as paper through electrophotography. The image formation device 100 is an image formation device with multiple colors in FIG. 20, but may alternatively be an image formation device of a single color.

In FIG. 20, the image formation device 100 includes an image data acquisition unit 50, image processors 60Y, 60M, 60C, and 60K, and an image formation unit 70.

The image data acquisition unit 50 acquires input image data represented by pixels of M gradations (M≧3). More specifically, the image data acquisition unit 50 receives an input of PDL (Page Description Language) data from an external information processor (for example, a client device such as a personal computer) or of scan data which are read from a document by a scanner, and converts the input data into bitmap image data of 256 gradations of 4 colors (Y, M, C, and K). The image data acquisition unit 50 outputs the acquired image data of Y, M, C, and K colors to the image processors 60Y, 60M, 60C, and 60K, respectively.

Each of the image processors 60Y, 60M, 60C, and 60K has a structure similar to that of the image processor of the above-described exemplary embodiments, and binarizes input image data of 256 gradations which are input from the image data acquisition unit 50 in a manner similar to the image processor of the exemplary embodiment, and generates output image data of two gradations.

The image formation unit 70 forms an image on a recording medium based on the output image data acquired by the image processors 60Y, 60M, 60C, and 60K.

More specifically, the image formation unit 70 has photosensitive structures 71Y, 71M, 71C, and 71K for yellow (Y), magenta (M), cyan (C), and black (K). In the periphery of the photosensitive structures 71Y, 71M, 71C, and 71K, charging units 72Y, 72M, 72C, and 72K, exposure units 73Y, 73M, 73C, and 73K, and developer units 74Y, 74M, 74C, and 74K are provided. The four photosensitive structures 71Y, 71M, 71C, and 71K are placed in parallel to each other along a paper transport direction (direction of an arrow X in FIG. 20), and a transfer belt 75 is provided to contact the photosensitive structures. In addition, downstream along the paper transport direction of the four photosensitive structures, a fixation unit 76 is placed.

The charging units 72Y, 72M, 72C, and 72K uniformly charge the surfaces of the photosensitive structures 71Y, 71M, 71C, and 71K, respectively.

The exposure units 73Y, 73M, 73C, and 73K irradiate the surfaces of the uniformly charged photosensitive structures 71Y, 71M, 71C, and 71K with a laser beam to form an electrostatic latent image. More specifically, the exposure units 73Y, 73M, 73C, and 73K control ON/OFF of the irradiation of the laser beam, respectively, based on the output image data of the two gradations which are input from the image processors 60Y, 60M, 60C, and 60K, respectively, so that electrostatic latent images corresponding to the output image data are formed on the photosensitive structures.

The developer units 74Y, 74M, 74C, and 74K develop the electrostatic latent images formed on the photosensitive structures 71Y, 71M, 71C, and 71K with toners of Y, M, C, and K colors, respectively.

The toner images of Y, M, C, and K colors formed on the photosensitive structures 71Y, 71M, 71C, and 71K are sequentially transferred to a recording medium such as paper transported on the transfer belt 75. The recording medium on which the toner images of the Y, M, C, and K colors are transferred is transported to the fixation unit 76, and the toner image is fixed on the recording medium in the fixation unit 76.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

For example, when the input image data includes multiple color components, the image processor may binarize each color component in a manner described above. In this case, from the viewpoint of reducing color unevenness due to interference of screens, the pattern of the threshold value (for example, the threshold value matrix) may be set so that the arrangement direction of the dot in the output image data differs for each color component. Alternatively, the pattern of the threshold value (for example, the threshold value matrix) may be set so that the period of the arrangement of the dot in the output image data differs for each color component. In this case, from the viewpoint of acquiring a superior periodicity, the number of black pixels in the black core pattern and the black growth pattern may be set, for each color component, according to the period of the dot of the color component.

In the above-described exemplary embodiments, the filling patterns include the first through third patterns, but it is also possible to provide an image processor in which the second pattern is omitted. In other words, an image processor having at least the first pattern and the third pattern as the filling pattern may be provided. In this image processor, the pattern determination unit determines the filling pattern to be the first or third pattern according to a size relationship of the corrected gradation value and the predetermined threshold value which spatially varies in a periodic manner, for example, regardless of whether or not a pixel determined as the black core pattern is present among the reference pixels.

What is claimed is:

1. An image processor comprising:
   a gradation value acquisition unit that acquires a gradation value of a pixel of interest which is a pixel sequentially selected as a target of a binarization process from input image data represented by pixels of M gradations, wherein M≧3; and
   a pattern determination unit that determines a filling pattern of a group of pixels of output image data corresponding to the pixel of interest according to a corrected gradation value acquired by adding, to the gradation value of the pixel of interest, an error value diffused from a pixel at a periphery of the pixel of interest, wherein the filling pattern includes at least a first pattern in which a predetermined plurality of pixels are filled and which forms a core of a dot and a third pattern in which substantially no pixel is filled and the pattern determination unit determines the filling pattern to be one of the first pattern and the third pattern according to a size relationship between the corrected gradation value and a predetermined threshold value which spatially varies in a periodic manner.

2. The image processor according to claim 1, wherein
   the filling pattern includes a second pattern in which a number of pixels are filled, the number corresponding to the corrected gradation value, and which forms a dot with the first pattern, and
   the pattern determination unit determines the filling pattern to be the second pattern when a pixel determined to be the first pattern is present among predetermined pixels adjacent to the pixel of interest, and determines the filling pattern to be one of the first pattern and the third pattern according to the size relationship between the corrected gradation value and the predetermined threshold value when no pixel determined to be the first pattern is present among the predetermined pixels.

3. The image processor according to claim 2, wherein
   at least one of the number of pixels to be filled in the first pattern and the number of pixels to be filled in the second pattern varies according to the gradation value of the pixel of interest so that the number becomes smaller as a density becomes smaller.

4. The image processor according to claim 3, wherein
when at least the number of pixels to be filled in the first pattern varies according to the gradation value of the pixel of interest, the number of pixels to be filled in the first pattern is a fixed value in a low-density region in which the gradation value of the pixel of interest is less than a predetermined value.

5. An image formation device comprising:
an image data acquisition unit that acquires input image data represented by pixels of M gradations, wherein $M \geq 3$;
an image processor that converts the input image data into output image data represented by pixels of two gradations; and
an image formation unit that forms an image based on the output image data on a recording medium, wherein
the image processor comprises:
a gradation value acquisition unit that acquires a gradation value of a pixel of interest which is a pixel sequentially selected as a target of a binarization process from the input image data; and
a pattern determination unit that determines a filling pattern of a group of pixels of output image data corresponding to the pixel of interest according to a corrected gradation value acquired by adding, to the gradation value of the pixel of interest, an error value diffused from a pixel at a periphery of the pixel of interest, wherein the filling pattern includes at least a first pattern in which a predetermined plurality of pixels are filled and which forms a core of a dot and a third pattern in which substantially no pixel is filled and the pattern determination unit determines the filling pattern to be one of the first pattern and the third pattern according to a size relationship between the corrected gradation value and a predetermined threshold value which spatially varies in a periodic manner.

6. A method of processing an image, the method comprising:
acquiring a gradation value of a pixel of interest which is a pixel sequentially selected as a target of a binarization process from input image data represented by pixels of M gradations, wherein $M \geq 3$; and
determining a filling pattern of a group of pixels of output image data corresponding to the pixel of interest according to a corrected gradation value acquired by adding, to the gradation value of the pixel of interest, an error value diffused from a pixel at a periphery of the pixel of interest, wherein
the filling pattern includes at least a first pattern in which a predetermined plurality of pixels are filled and which forms a core of a dot and a third pattern in which substantially no pixel is filled, and
the determining the pattern includes determining the filling pattern to be one of the first pattern and the third pattern according to a size relationship between the corrected gradation value and a predetermined threshold value which spatially varies in a periodic manner.

7. A non-transitory computer-readable medium storing a program causing a computer to execute a process for processing an image, the process comprising:
acquiring a gradation value of a pixel of interest which is a pixel sequentially selected as a target of a binarization process from input image data represented by pixels of M gradations, wherein $M \geq 3$; and
determining a filling pattern of a group of pixels of output image data corresponding to the pixel of interest according to a corrected gradation value acquired by adding, to the gradation value of the pixel of interest, an error value diffused from a pixel at a periphery of the pixel of interest, wherein
the filling pattern includes at least a first pattern in which a predetermined plurality of pixels are filled and which forms a core of a dot and a third pattern in which substantially no pixel is filled, and
the determining the pattern includes determining the filling pattern to be one of the first pattern and the third pattern according to a size relationship between the corrected gradation value and a predetermined threshold value which spatially varies in a periodic manner.

8. The non-transitory computer-readable medium according to claim 7, wherein
the filling pattern includes a second pattern in which a number of pixels are filled, the number corresponding to the corrected gradation value, and which forms the dot with the first pattern, and
the determining the pattern includes determining the filling pattern to be the second pattern when a pixel determined to be the first pattern is present among predetermined pixels adjacent to the pixel of interest, and determining the filling pattern to be one of the first pattern and the third pattern according to the size relationship between the corrected gradation value and the predetermined threshold value when no pixel determined to be the first pattern is present among the predetermined pixels.

9. The non-transitory computer-readable medium according to claim 8, wherein
at least one of the number of pixels to be filled in the first pattern and the number of pixels to be filled in the second pattern varies according to the gradation value of the pixel of interest so that the number becomes smaller as a density becomes smaller.

10. The non-transitory computer-readable medium according to claim 9, wherein
when at least the number of pixels to be filled in the first pattern varies according to the gradation value of the pixel of interest, the number of pixels to be filled in the first pattern is a fixed value in a low-density region in which the gradation value of the pixel of interest is less than a predetermined value.

* * * * *